(12) United States Patent  (10) Patent No.: US 8,179,635 B2
Schabes et al.  (45) Date of Patent: May 15, 2012

(54) SINGLE POLE TIP WRITE HEAD DESIGN FOR PERPENDICULAR RECORDING MEDIA HAVING REDUCED DEPENDENCE ON SOFT UNDERLAYERS

(75) Inventors: Manfred Ernst Schabes, Saratoga, CA (US); Petrus Antonius Van Der Heijden, San Jose, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 977 days.

(21) Appl. No.: 12/011,654

(22) Filed: Jan. 28, 2008

(65) Prior Publication Data

US 2009/0190256 A1  Jul. 30, 2009

(51) Int. Cl.
G11B 5/127 (2006.01)
(52) U.S. Cl. ................................. 360/125.16
(58) Field of Classification Search .............. 360/125.16
See application file for complete search history.

(56) References Cited

U.S. PATENT DOCUMENTS

| | | | |
|---|---|---|---|
| 2004/0212923 A1* | 10/2004 | Taguchi | 360/125 |
| 2005/0157424 A1 | 7/2005 | Kuroda et al. | |
| 2005/0219746 A1 | 10/2005 | Takano et al. | |
| 2005/0237665 A1 | 10/2005 | Guan et al. | |
| 2005/0259356 A1 | 11/2005 | Han et al. | |
| 2006/0044682 A1 | 3/2006 | Le et al. | |
| 2006/0092568 A1 | 5/2006 | Chen et al. | |

* cited by examiner

*Primary Examiner* — David D Davis
(74) *Attorney, Agent, or Firm* — D'Arcy H. Lorimer; Lorimer Labs (57) ABSTRACT

A thin film, perpendicular write head for use with recording media with or without a soft under layer is disclosed. The present invention comprises an tapered auxiliary pole, situated below the main write pole and separated from the write pole by a lower non-magnetic gap. The auxiliary pole alleviates problems such as erasure after write, and cross track stray erasure fields, associated with operating conventionally designed perpendicular writes heads with media having no soft under layer.

25 Claims, 7 Drawing Sheets

SINGLE POLE TIP WRITE HEAD DESIGN FOR PERPENDICULAR RECORDING MEDIA HAVING REDUCED DEPENDENCE ON SOFT UNDERLAYERS

BACKGROUND OF THE INVENTION

1. Field of the Invention

This invention relates to structures of thin film magnetic write heads. More specifically, the invention relates to perpendicular thin film write heads for recording on media with or without soft under layers.

2. Description of the Related Art

Single pole tip write heads having trailing shields or wrap around shields are currently used for perpendicular recording. The media upon which data is written (for example, the hard disk in a hard disk drive) comprises a layered structure having various, layers. The upper layers contain a hard magnetic data layer, followed by non-magnetic layers, followed by a magnetic soft under layer. For reasons concerning future media development, it is desirable to eliminate the soft under layer. For reasons of compatibility and continuity in development, it is also desirable that new head designs be operable both with and without the soft under layers. However, for prior art write heads of convention construction having, for example, wrap around shields, removing the soft under layer results in a large return flux at the wrap around shield adjacent to the write pole. In the down track direction, this results in a large negative field following the maximum positive field at the trailing edge of the pole. This may result in unwanted erasure of data being written to the media. Additionally, cross-track field profiles show an increase in stray erasure fields of adjacent tracks when no soft under layer is present. Currently, no prior art design is suitable for perpendicular recording at high density without the presence of a soft under layer.

What is needed is a perpendicular thin film head design that is suitable for recording on media with or without a soft under layer.

SUMMARY OF THE INVENTION

It is an object of the present invention to provide a thin film perpendicular head containing a write pole having an upper surface and a lower surface opposing the upper surface; a non-magnetic top gap in contact the said upper surface of the write pole; a non-magnetic bottom gap in contact with the lower surface of the write pole, the non-magnetic top gap having a thickness approximately equal to the thickness of the non-magnetic bottom gap; and, an auxiliary pole, having a top surface, the bottom gap in contact with the top surface of the auxiliary pole.

It is an object of the present invention to provide a thin film perpendicular head containing a write pole having an upper surface and a lower surface opposing the upper surface; a non-magnetic top gap in contact the said upper surface of the write pole; a non-magnetic bottom gap in contact with the lower surface of the write pole, the non-magnetic top gap having a thickness approximately equal to the thickness of the non-magnetic bottom gap; a lower return pole layer having a pedestal magnetically coupled to the lower return pole layer; and, an auxiliary pole, having a top surface and a base surface, the base surface in contact with the pedestal, the bottom gap in contact with the top surface of the auxiliary pole, the auxiliary pole situated between the write pole and the pedestal.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
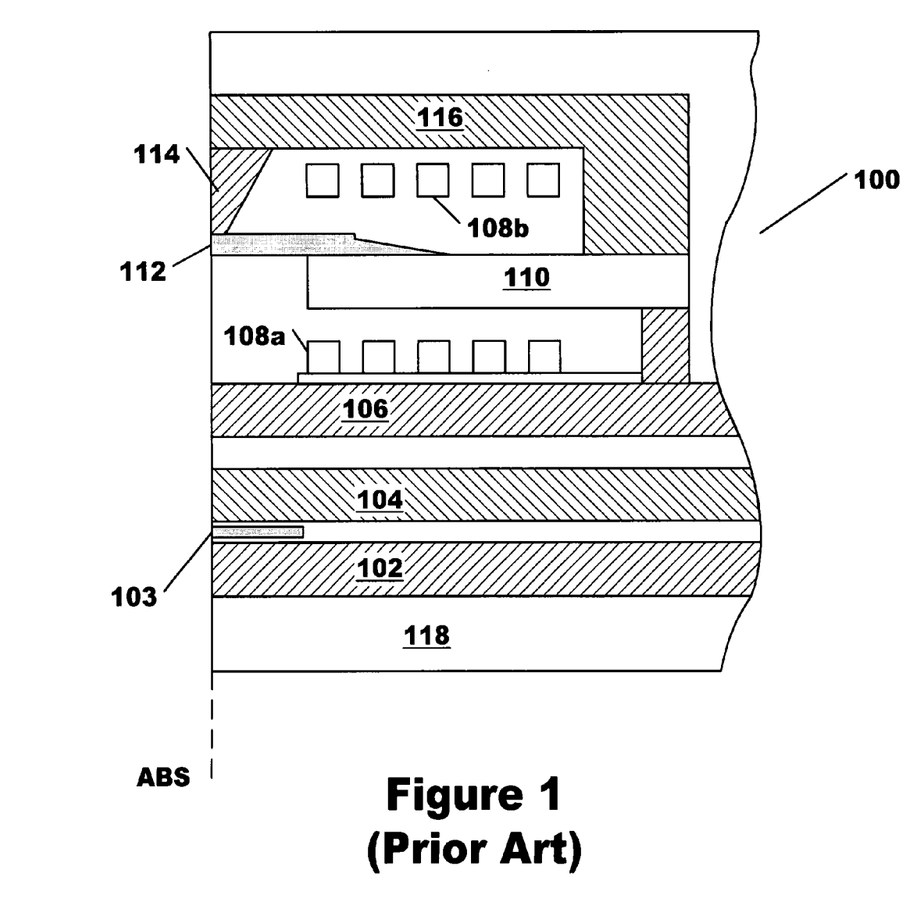
FIG. 1 (Prior Art) is a partial cross section view of a typical thin film perpendicular head structure.

FIG. 1 (Prior Art) is a partial, cross sectional view of a typical thin film perpendicular head 100. The head comprises shield layers 102, 104, MR read sensor 103, shaping layer 110, coil structures 108a,b, main write pole 112, lower return pole layer 106, wrap around shield 114, and upper return pole layer 116. Alternatively, structure 114 may also be a trailing shield. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

Figure 2:
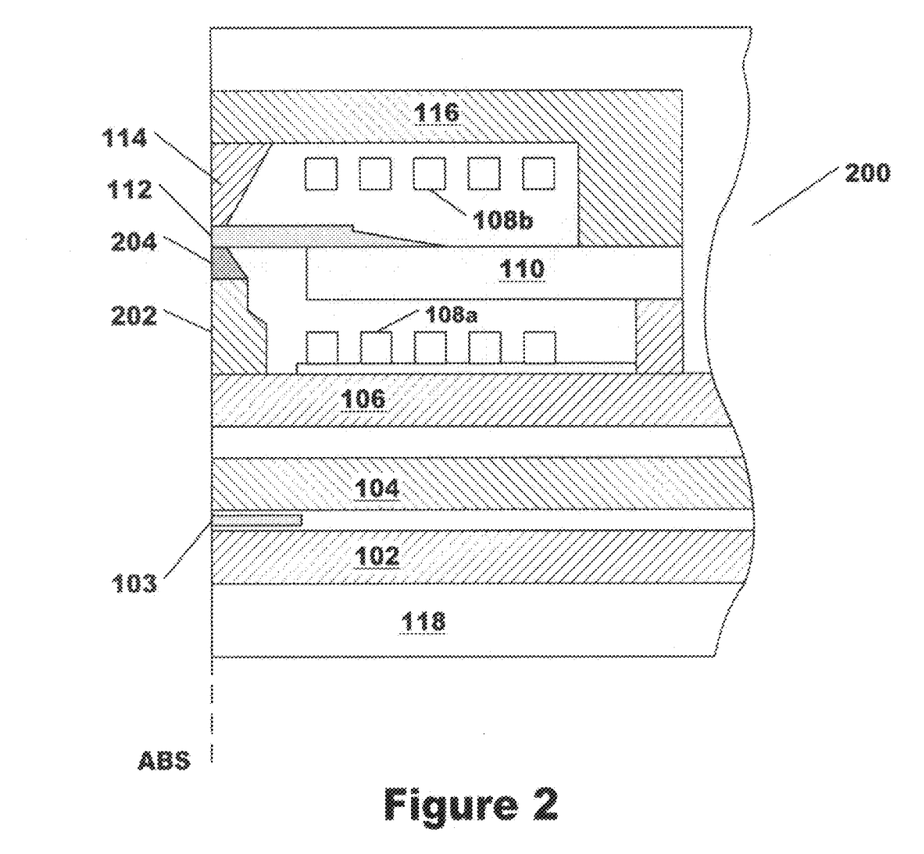
FIG. 2 is a partial cross section view of a thin film perpendicular head, in accordance with an embodiment of the present invention.

FIG. 2 is a partial cross section view 200 of a thin film perpendicular head, in accordance with an embodiment of the present invention. Notable features of this head that distinguish it from designs of the prior art are pedestal 202 and auxiliary pole 204. Auxiliary pole 204 is magnetically coupled to pedestal 202. Pedestal 202 is, in turn, magnetically coupled to lower return pole layer 106. Both pedestal 202 and auxiliary pole 204 are comprised of suitable magnetic materials, similar to the composition of write pole 112, or return pole layers 106, 116, in accordance with information well known to those skilled in the art. Auxiliary pole 204 enables an additional leading edge flux return path, reducing the need for a soft under layer within the media, while maintaining the appropriate write field strength and field profile. Location of the auxiliary pole 204 at the leading edge provides a low reluctance flux return path for write pole 112, which provides a write field of sufficient magnitude. Concentration of the return flux at the leading edge also reduces the problem of large erasure field following the write field, and cross track erasure fields that would be present in the conventional head design of FIG. 1 (Prior Art) used with media lacking a soft under layer. An important aspect of the present invention is that it reduces the reliance of head design on media design. In the conventional head of FIG. 1, the distance of the write pole tip to the soft under layer is an important parameter, but this distance is dependent on head ABS to media dimensions as well as deposited film thickness dimensions of the media. As areal densities increase and dimensions are reduced, it is becoming harder to control these dimensions within acceptable tolerances. Removing or reducing the need for a soft under layer in the media reduces the importance of a variable that now can be controlled primarily by head design.

Figure 3:
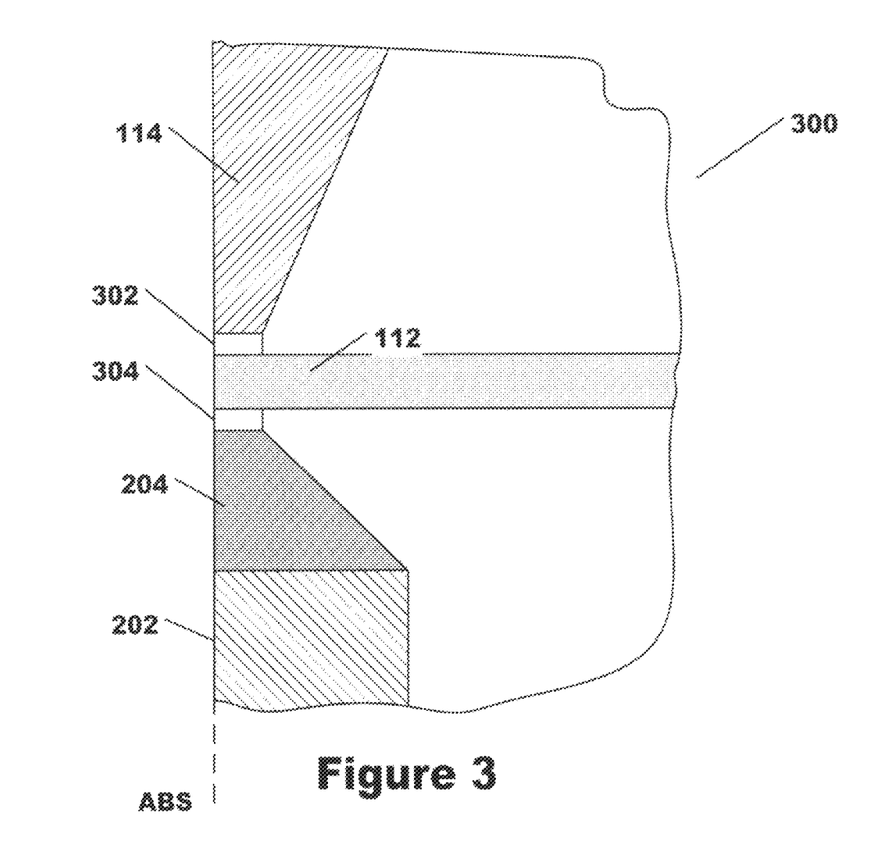
FIG. 3 is a partial cross section expanded view of FIG. 2, in accordance with an embodiment of the present invention.

FIG. 3 is a partial cross section expanded view 300 of FIG. 2, in accordance with an embodiment of the present invention. Auxiliary pole 204 is separated from write pole 112 by lower gap layer 304, which is comprised of a suitable non-magnetic material. Top gap 302 is the non-magnetic gap between the write pole 112 and shield 114. Shield 114 may be a wrap around shield or trailing shield. The materials and thickness of gaps 302, 304 are similar.

Figure 4:
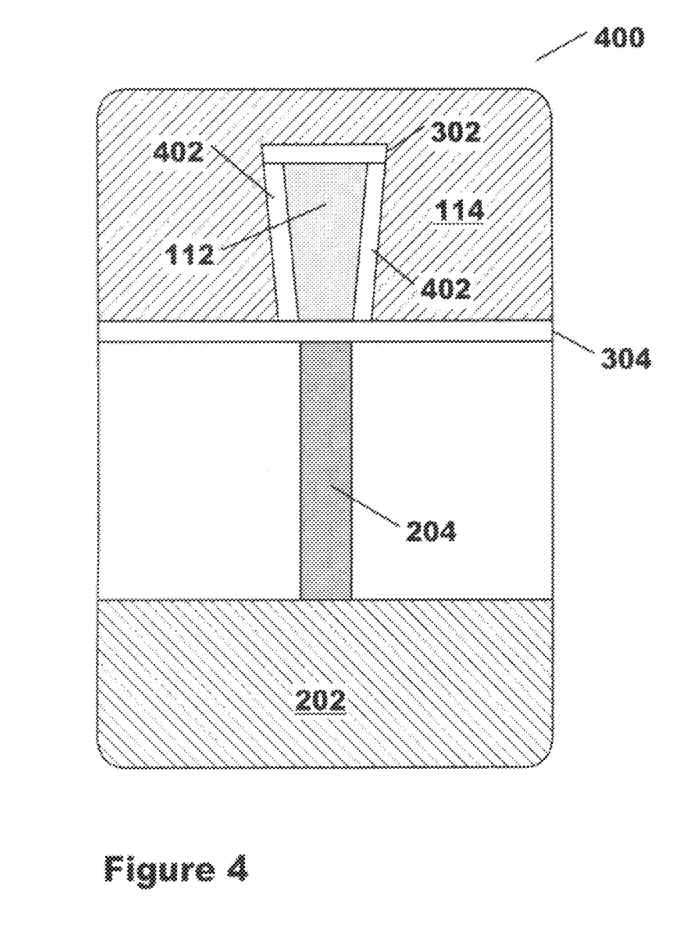
FIG. 4 is a partial, expanded ABS view of the embodiment of FIG. 3, in accordance with an embodiment of the present invention.

FIG. 4 is a partial, expanded ABS view 400 of the embodiment of FIG. 3, in accordance with an embodiment of the present invention. This is a partial view of write pole 112, auxiliary pole 204, pedestal 202, top gap 302, side gaps 402, and lower gap 304, looking into the structure at the air bearing surface. Pedestal 204 is about as wide (in the cross track directions on either side of write pole 112) as shield 114 (not shown). The width of auxiliary pole 204 is approximately the same as the width of write pole 112. As previously noted, the thickness of lower gap 304 is approximately the same as top gap 302. Although lower gap 304 is illustrated as a continuous layer extending in the cross track direction on either side of auxiliary pole 204, it shall be recognized that this layer may be localized to the region immediately above the auxiliary pole 204, or that it may be comprised of non-magnetic material surrounding the auxiliary pole (and not a separate layer), in accordance with fabrication techniques well known to those in the art. What is important is that a non-magnetic gap of thickness similar to top gap 302, be present between the top of auxiliary pole 204 and the lower boundary of write pole 112. Auxiliary pole 204 is magnetically coupled to, pedestal 202. This may be done through direct contact, or through a thin non-magnetic gap layer (not shown).

Figure 5A:
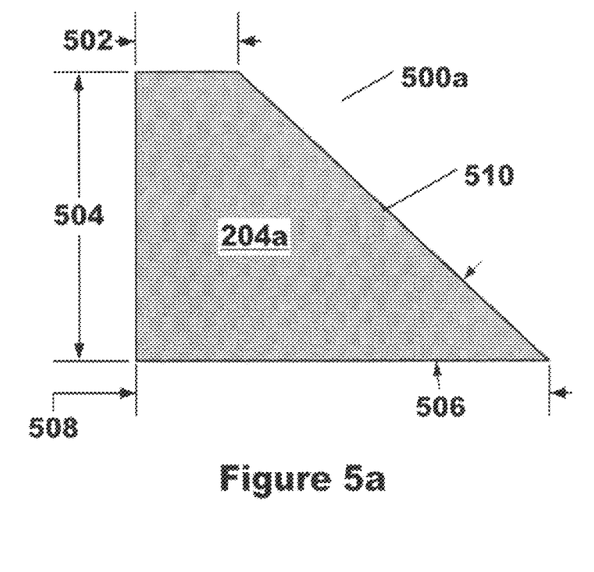
FIGS. 5a-5d are a detailed cross section views of auxiliary pole 204, in accordance with embodiments of the present invention.
Figure 5B:
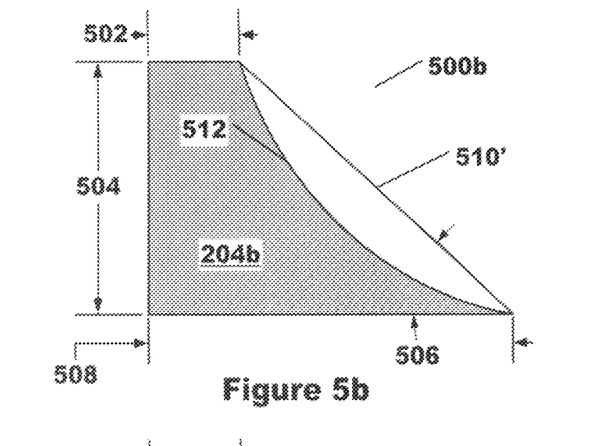
Figure 5C:
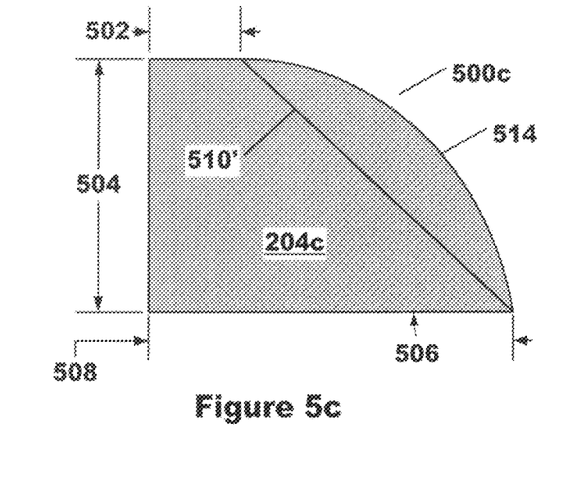
Figure 5D:
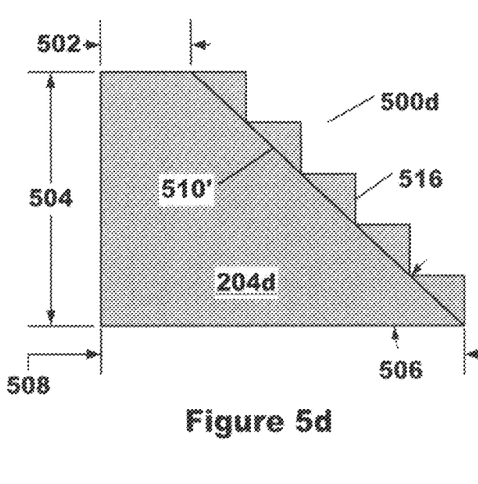

FIGS. 5a-5d are a detailed cross section views 500a-500d of auxiliary poles 204a-204d, in accordance with embodiments of the present invention. FIG. 5a illustrates a first embodiment of the present invention. Auxiliary pole 204a has a base surface of length 508, a front surface defining the height 504, and a tapered, trailing surface 510. Auxiliary pole 204a has a top surface of length 502, which is the portion of the boundary of auxiliary pole 204a in contact with lower gap layer 304, length 502 being approximately equal to the throat height of shield 114. The height 504 of auxiliary pole 204 is greater than two times the thickness of top gap 302. Length 508 of the base surface is equal to the length 502 of the top surface plus height 504 divided by tan(angle 506). Angle 506 is between 5 and 75 degrees. FIG. 5b illustrates a second embodiment 204b of the present invention. In this embodiment, trailing surface 512 is concave in shape. Angle 506 is determined by a line segment 510' connecting the rearward boundary of the top surface with the rearward boundary of the base surface. FIG. 5c illustrates a third embodiment 204c of the present invention, wherein trailing surface 514 is convex in shape. Angle 506 is determined by a line segment 510' as described above. FIG. 5d illustrates a fourth embodiment 204d of the present invention, wherein trailing surface 516 is stepped in shape. Angle 506 is determined by a line segment 510', as previously described. All the forgoing embodiments of FIGS. 5a-5d, while having different trailing shapes, provide suitable functionality for the auxiliary pole.

Figure 6A:
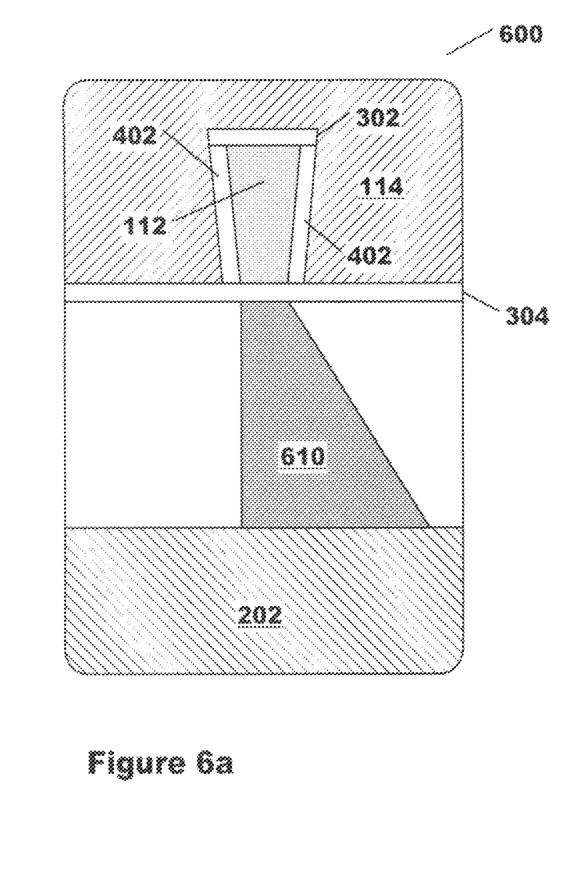
FIG. 6a is partial, ABS view of an auxiliary pole, in accordance with an alternative embodiment of the present invention.
Figure 6B:
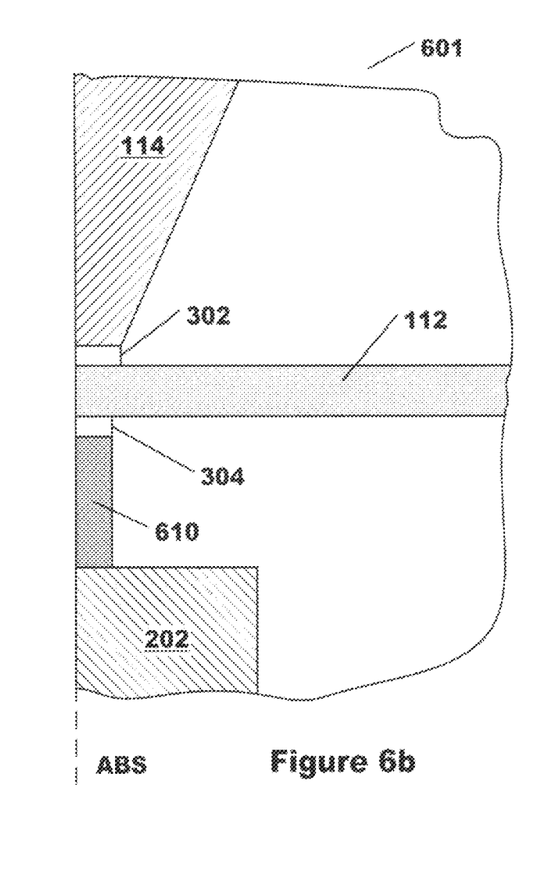
FIG. 6b is a partial, cross section view of the embodiment of FIG. 6a, in accordance with an alternative embodiment of the present invention; and, FIGS. 6c, 6d are partial, ABS views of auxiliary poles, in accordance with additional alternative embodiments of the present invention.

FIG. 6a is partial, ABS view 600 of an auxiliary pole 610, in accordance with an alternative embodiment of the present invention. In this embodiment, the auxiliary pole 204 of FIGS. 2-5 is rotated about 90 degrees. FIG. 6b is a partial, cross section view 601 of the embodiment of FIG. 6a. The thickness (or width) of auxiliary pole 610 is approximately equal to the throat height of shield 114. Dimension 502 is approximately the width of write pole 112. Angle 506 is as previously disclosed.

Figure 6C:
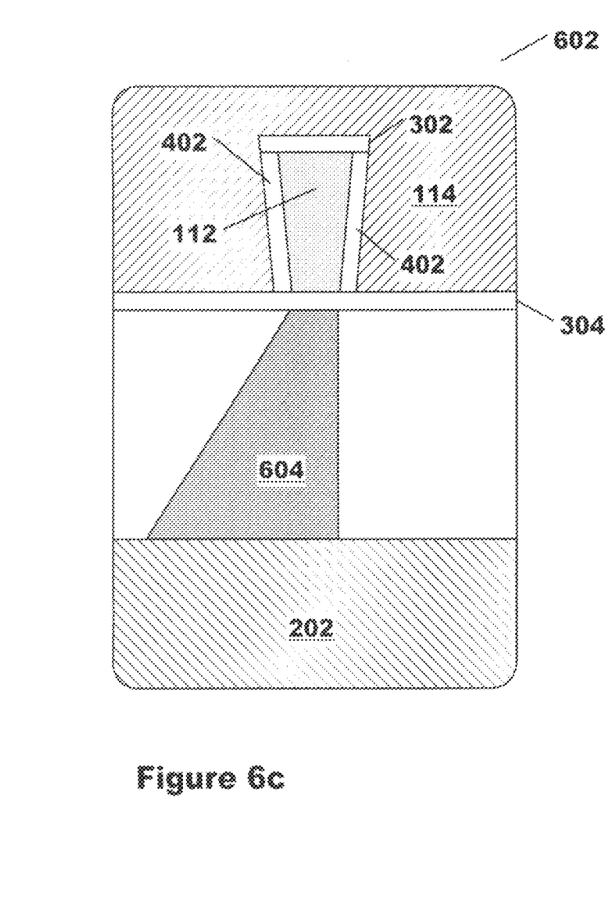
Figure 6D:
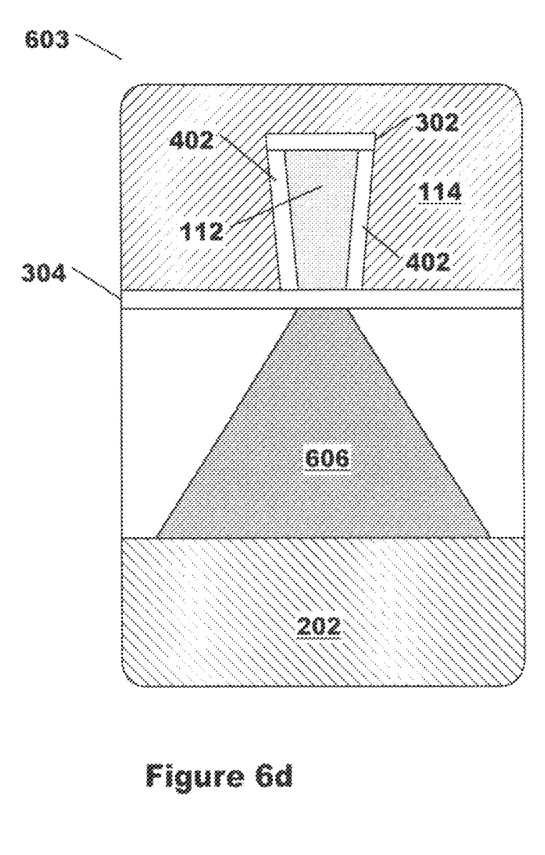

FIGS. 6c, 6d are partial, ABS views 602, 603 of auxiliary poles, in accordance with additional alternative embodiments of the present invention. FIG. 6c illustrates auxiliary pole 604, the embodiment of FIGS. 6a, 6b rotated 180 degrees. Dimensions cited for the embodiment of FIGS. 6a, 6b apply. FIG. 6d is a further embodiment of the present invention auxiliary pole 606, combining the geometries of the embodiments shown in FIGS. 6a-6c. Auxiliary pole 606 is symmetric about an axis perpendicular to the boundary with pedestal 202, said axis proceeding though and bisecting write pole 112. Angles at the base (the surface in contact with pedestal 202) of auxiliary pole 606 are equal, with values as disclosed for angle 506 of FIGS. 5a-5d. The top surface of auxiliary pole 606 in contact with lower gap 304 is approximately equal to the throat height of shield 114. The two tapered, trailing surfaces may also have convex, concave, or stepped shapes as shown in embodiments of FIGS. 5b-d.

It should be noted that the embodiments of FIGS. 6a and 6c can be rotated to any angle between the position illustrated and that of the embodiment of FIGS. 2-4. Although location at angles other than that shown in FIGS. 2-4 and 6a, 6c may provide challenges for fabrication, and may be not as desirable, this does not, in anyway, detract from the fact that the function of the invention at these alternate locations is not diminished.

The present invention is not limited by the previous embodiments heretofore described. Rather, the scope of the present invention is to be defined by these descriptions taken together with the attached claims and their equivalents.

What is claimed is:

1. A thin film perpendicular head comprising;
   a write pole having an upper surface, a lower surface opposing said upper surface, a first side surface, and a second side surface;
   a first non-magnetic side gap in contact with said first side surface of said write pole;
   a second non-magnetic side gap in contact with said second side surface of said write pole;
   a wrap around shield situated above said write pole, said wrap around shield in contact with said first and second non-magnetic side gaps;
   a non-magnetic top gap in contact with said upper surface of said write pole, said non-magnetic top gap situated between said wrap around shield and said write pole;
   a non-magnetic bottom gap in contact with said lower surface of said write pole, said non-magnetic top gap having a thickness approximately equal to a thickness of said non-magnetic bottom gap; and,
   an auxiliary pole, having a top surface, said bottom gap in contact with said top surface of said auxiliary pole.

2. The thin film head as recited in claim 1, wherein said auxiliary pole has a height greater than two times said thickness of said non-magnetic bottom gap.

3. The thin film head as recited in claim 2, wherein said auxiliary pole has a width approximately equal to a width of said write pole.

4. The thin film head as recited in claim 3, wherein said auxiliary pole has a front surface defined by said width of said auxiliary pole and said height of said auxiliary pole, said front surface being approximately perpendicular to said top surface, said auxiliary pole situated such that said front surface is parallel with an air bearing surface of said thin film head.

5. The thin film head as recited in claim 4, wherein said thin film head comprises a shield having a throat height, said top surface of said auxiliary pole having a length approximately equal to said throat height of said shield.

6. The thin film head as recited in claim 5, wherein said auxiliary pole has a base surface approximately parallel to said top surface, said base surface separated from said top surface by said height, said base surface having a length greater than said length of said top surface.

7. The thin film head as recited in claim 6, wherein said auxiliary pole has a trailing surface connecting said top surface with said base surface.

8. The thin film head as recited in claim 7, wherein said trailing surface is planar.

9. The thin film head as recited in claim 7, wherein said trailing surface has a convex shape.

10. The thin film head as recited in claim 7, wherein said trailing surface has a concave shape.

11. The thin film head as recited in claim 7, wherein said trailing surface has a stepped shape.

12. The thin film head as recited in claim 2, wherein said thin film head comprises a shield having a throat height, said auxiliary pole having a width approximately equal to said throat height of said wrap around shield.

13. The thin film head as recited in claim 12, wherein said auxiliary pole has a front surface defined by said width of said auxiliary pole and said height of said auxiliary pole, said front surface being approximately perpendicular to said top surface, said auxiliary pole situated such that said front surface is perpendicular with an air bearing surface of said thin film head.

14. The thin film head as recited in claim 13, wherein said auxiliary pole has a base surface approximately parallel to said top surface, said base surface separated from said top surface by said height, said base surface having a length greater than said length of said top surface.

15. The thin film head as recited in claim 14, wherein said auxiliary pole has a trailing surface connecting said top surface with said base surface.

16. The thin film head as recited in claim 15, wherein said trailing surface is planar.

17. The thin film head as recited in claim 15, wherein said trailing surface has a convex shape.

18. The thin film head as recited in claim 15, wherein said trailing surface has a concave shape.

19. The thin film head as recited in claim 15, wherein said trailing surface has a stepped shape.

20. The thin film head as recited in claim 2, wherein said auxiliary pole has a base surface approximately parallel to said top surface, said base surface separated from said top surface by said height, said base surface having a length greater than a length of said top surface, said auxiliary pole having two, opposed trailing surfaces connecting said top surface with said base surface.

21. The thin film head as recited in claim 20, wherein said opposed trailing surfaces have a convex shape.

22. The thin film head as recited in claim 20, wherein said opposed trailing surfaces have a linear shape.

23. The thin film head as recited in claim 20, wherein said opposed trailing surfaces have a stepped shape.

24. The thin film head as recited in claim 20, wherein said opposed trailing surfaces have a concave shape.

25. A thin film perpendicular had comprising;
a write pole having an upper surface, a lower surface opposing said upper surface, a first side surface, and a second side surface;
a first non-magnetic side gap in contact with said first side surface of said write pole;
a second non-magnetic side gap in contact with said second side surface of said write pole;
a wrap around shield situated above said write pole, said wrap around shield in contact with said first and second non-magnetic side gaps;
a non-magnetic top gap in contact with said upper surface of said write pole, said non-magnetic top gap situated between said wrap around shield and said write pole;
a non-magnetic bottom gap in contact with said lower surface of said write pole, said non-magnetic top gap having a thickness approximately equal to a thickness of said non-magnetic bottom gap;
a lower return pole layer having a pedestal magnetically coupled to said lower return pole layer; and,
an auxiliary pole, having a top surface and a base surface, said base surface in contact with said pedestal, said bottom gap in contact with said top surface of said auxiliary pole, said auxiliary pole situated between said write pole and said pedestal.

* * * * *